E. J. SONNENBURG.
FLEXIBLE TAPE LOOSE LEAF BINDER.
APPLICATION FILED DEC. 13, 1911.
1,051,287.
Patented Jan. 21, 1913.
2 SHEETS—SHEET 2.
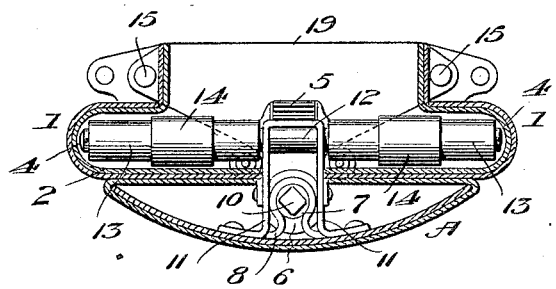
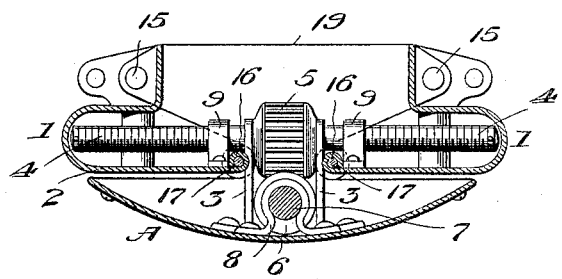
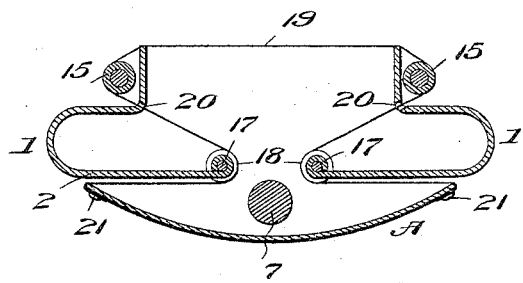
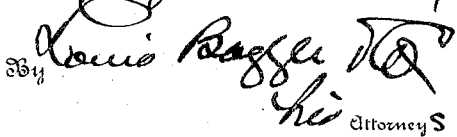

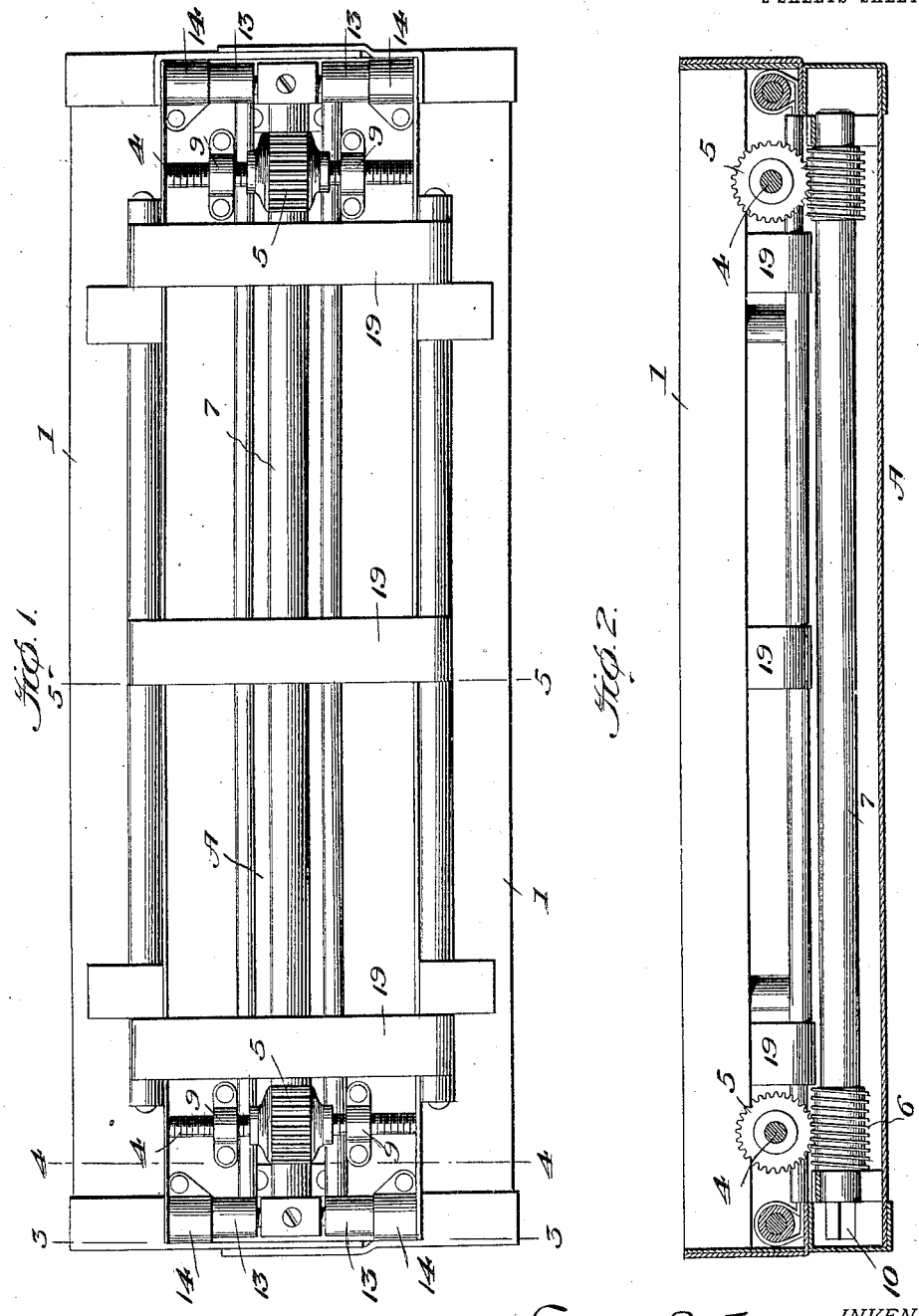

UNITED STATES PATENT OFFICE.

EDWARD J. SONNENBURG, OF RIVERSIDE, CALIFORNIA.

FLEXIBLE-TAPE LOOSE-LEAF BINDER.

1,051,287. Specification of Letters Patent. Patented Jan. 21, 1913.

Application filed December 13, 1911. Serial No. 665,447.

*To all whom it may concern:*

Be it known that I, EDWARD J. SONNENBURG, a citizen of the United States, residing at Riverside, in county of Riverside and State of California, have invented certain new and useful Improvements in Flexible-Tape Loose-Leaf Binders, of which the following is a specification.

My invention relates to an improvement in temporary binders, and the object is to provide flexible tapes upon which the loose leaves are mounted, said tapes adapted to be held under tension at all times by the means which causes the sides to be moved toward and from each other in binding the leaves between the sides and in causing the sides to be moved from each other for the removal or insertion of leaves upon the tapes between the sides.

The invention consists in certain novel features of construction and combinations of parts which will be hereinafter fully described and pointed out in the claims.

In the accompanying drawings, Figure 1 is a top plan view of the invention; Fig. 2 is a longitudinal vertical sectional view; Fig. 3 is a transverse section on the line 3—3 of Fig. 1; Fig. 4 is a transverse section on the line 4—4 of Fig. 1; and Fig. 5 is a transverse section on the line 5—5 of Fig. 1.

A represents the back of the binder, and 1, 1, are the sides. Each side member 1 is provided with a base or bottom 2, which protrudes or extends in front of the back A. Brackets 3, 3, are connected to the back A, in which brackets screw shafts 4, 4, are mounted. Each screw shaft is provided with gears 5, which mesh with worm gears 6 on the worm shaft 7, which shaft is journaled in bearings 8 on the back A. Screw-threaded bearings or nuts 9 are connected to the bottoms 2 of the sides 1, which have screw-threaded engagement with the screw shafts 4, whereby the sides 1 are caused to move from and toward each other upon the rotation of the shaft 7, which can be accomplished in any approved manner, but I have shown one end of the shaft squared, as at 10, to which a key can be applied for rotating the shaft. Standards 11, 11, are connected to the back A at each end thereof, and pins 12 are carried by the standards, the ends of which are received in sleeves 13, 13, which sleeves are secured to the bottoms 2 of the sides 1 by means of straps 14, 14. The object of these pins and sleeves is to secure rigidity for the sides, and insure perfect alinement in the movement of the sides from and toward each other. Journaled between the ends of the sides and preferably on the exterior surface thereof are rollers 15. The inner ends or edges of the bottoms 2 of the sides 1 are preferably rolled inward, as at 16, for forming bearings for shafts 17, upon which shafts rollers 18, 18, are mounted at predetermined intervals. A plurality of straps 19 of flexible material such as steel, leather and the like, are received over the upper ends of the sides and extend across the space formed between the sides, thence over the rollers 15, thence through openings 20, 20, in the sides, and over the rollers 18 carried by the bottoms 2 of the sides, and thence to the longitudinal edges of the back A, where the ends of the straps are connected by any suitable means, such as screws 21, 21.

It will therefore be seen that upon the rotation of the worm shaft 7 for causing the sides to move either toward or from each other, the flexible tapes will always be under tension; they will never be slackened, as the separation of the sides causes the tape to be retained in its taut position, and when the sides move toward each other, the tapes will still be retained in their taut position. As the bottoms of the sides move toward each other, the difference in the length of the tape which extended between the sides will be taken up between the inner ends of the bottoms of the sides and the outer edges of the back.

From the foregoing it will be seen that the sides can be readily moved from each other upon the rotation of the worm shaft 7, causing the worm gears thereon to rotate the gear wheels upon the screw shafts 4. The turning of the screw shafts 4 causes the sides to separate. This movement removes the sides and covers away from the leaves, so that the leaves can be removed from the tapes, or additional leaves applied to the tapes. After this has been accomplished, the worm shaft can again be turned, causing the sides to be moved toward each other for binding the leaves securely therebetween, and in such a manner that the leaves will be flexible so that they can be used without the necessity of separating the sides when it is desired to make entries or the like thereon.

Having fully described my invention, what I claim as new and desire to secure by Letters Patent, is:—

1. A temporary binder comprising sides adapted to be contracted and expanded, and flexible holding means for the leaves in engagement with the sides, said sides maintaining the holding means taut at all times, and stationary means connected to the sides and having the leaf holding means connected thereto for holding the leaf holding means so that said holding means can be acted upon by the sides and retained taut at all times.

2. A temporary binder comprising sides, means for expanding and contracting the sides, and flexible holding means for the leaves in engagement with the sides, said sides maintaining the holding means in a state of tension at all times, and stationary means connected to the sides and having the leaf holding means connected thereto for holding the leaf holding means so that said holding means can be acted upon by the sides and retained taut at all times.

3. A temporary binder comprising sides and a back, means for supporting the sides on the back, means for expanding and contracting the sides, and flexible means extending over the sides and connected to the back for supporting the leaves in the binder, said sides maintaining the flexible means taut at all times.

4. In a temporary binder the combination with a back, of sides movably mounted upon the back, means for expanding and contracting the sides, said sides provided with slots, and flexible means extending over the upper edges of the sides and through the slots in the sides and over the lower edges of the sides and connected to the back, said sides maintaining said flexible means in a state of tension at all times.

5. A temporary binder comprising a back and sides, expanding and contracting means mounted on the sides, means for operating said means for expanding and contracting the sides, brackets connected to the back and said expanding and contracting means for supporting the sides, and means on the back engaging the sides for holding the sides in position and alinement.

6. A temporary binder comprising a back and sides, said sides adapted to be moved from and toward each other, flexible means extending between and connected to said sides and fastened to the back for supporting the leaves, and pins carried by the back engaging the sides for holding the sides in position and alinement.

7. A temporary binder comprising sides and a back, said sides adapted to be contracted and expanded, and flexible holding means for the leaves rigidly and immovably connected to the back and in engagement with the sides, whereby the sides will maintain the holding means taut in all movements of the sides.

In testimony whereof I affix my signature, in the presence of two witnesses.

EDWARD J. SONNENBURG.

Witnesses:
R. AMOS,
M. ESTUDILLO.

---

Copies of this patent may be obtained for five cents each, by addressing the "Commissioner of Patents, Washington, D. C."